Nov. 7, 1944.　　　G. M. REED ET AL　　　2,362,304
ELECTRICAL SWITCHGEAR
Filed Dec. 29, 1941　　　2 Sheets-Sheet 1

Inventors:
George M. Reed,
Bertram W. Mahoney,
by Harry E. Dunham
Their Attorney.

Nov. 7, 1944. G. M. REED ET AL 2,362,304
ELECTRICAL SWITCHGEAR
Filed Dec. 29, 1941 2 Sheets-Sheet 2

Inventors:
George M. Reed,
Bertram W. Mahoney,
by Harry E. Dunham
Their Attorney.

Patented Nov. 7, 1944

2,362,304

UNITED STATES PATENT OFFICE 2,362,304

ELECTRICAL SWITCHGEAR

George M. Reed, Upper Darby, and Bertram W. Mahoney, Drexel Hill, Pa., assignors to General Electric Company, a corporation of New York Application December 29, 1941, Serial No. 424,760

1 Claim. (Cl. 175—307)

Our invention relates to electrical switchgear and specifically to metal-clad switchgear which is especially adapted for use in corrosive and hazardous atmospheres.

As will be understood by those skilled in the art, metal-clad switchgear consists of a metal structure containing a circuit breaker and other associated equipment, such as instrument transformers, buses, and connections. The transformers, insulated buses, and connections are usually placed in separate grounded metal compartments. Generally, the circuit breaker is equipped with self-coupling disconnecting devices and is arranged with a position-changing mechanism for moving it physically from the connected to the disconnected position after which it can be removed from the stationary metal structure. Interlocks are generally provided to insure proper sequence and safe operation. Metal-clad equipment is generally shipped from the factory completely assembled and a switching station or the like is built up from a plurality of metal-clad units arranged adjacent one another with the common members, such as the bus bars and the control wiring, properly connected between the adjacent units.

Metal-clad switchgear of the above-described type has been used successfully for some time. It would be desirable to be able to use such metal-clad switchgear with its many advantages for installations where it is subject to corrosive and hazardous atmospheres, such as in oil refineries or similar applications where switching of large blocks of power is desired.

Accordingly, it is an object of our invention to provide new and improved electrical switchgear which is particularly adapted for use in corrosive or hazardous atmospheres.

It is another object of our invention to provide electrical switchgear of multiunit construction having common members, such as bus bars, control wiring, and the like, which switchgear is provided with effective sealing means for preventing communication of air or gases between the units or between any unit and atmosphere.

Further objects and advantages of our invention will become apparent as the following description proceeds and the features of novelty which characterize our invention will be pointed out with particularity in the claim annexed to and forming a part of this specification.

Figure 1:
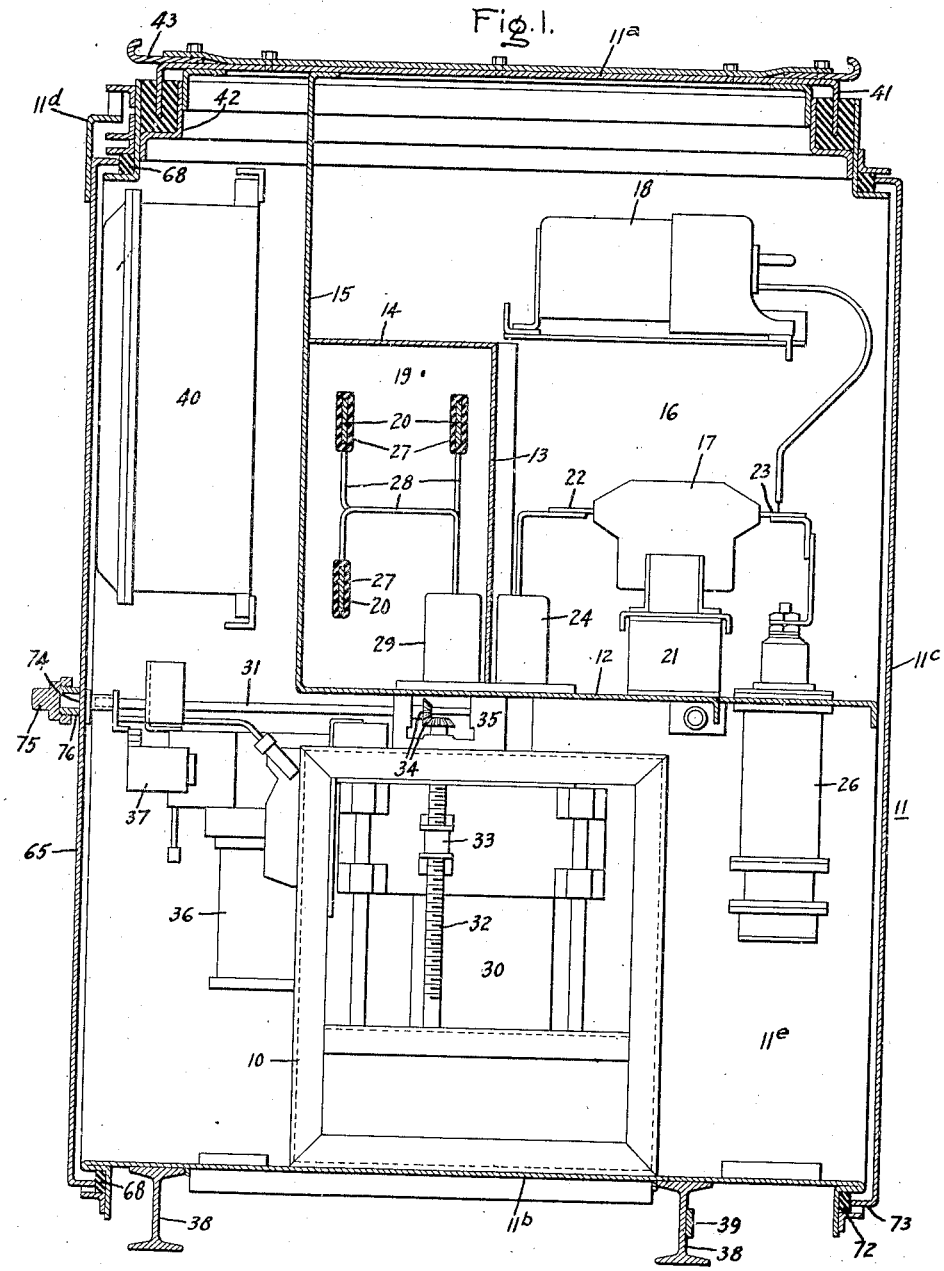
Figure 2:
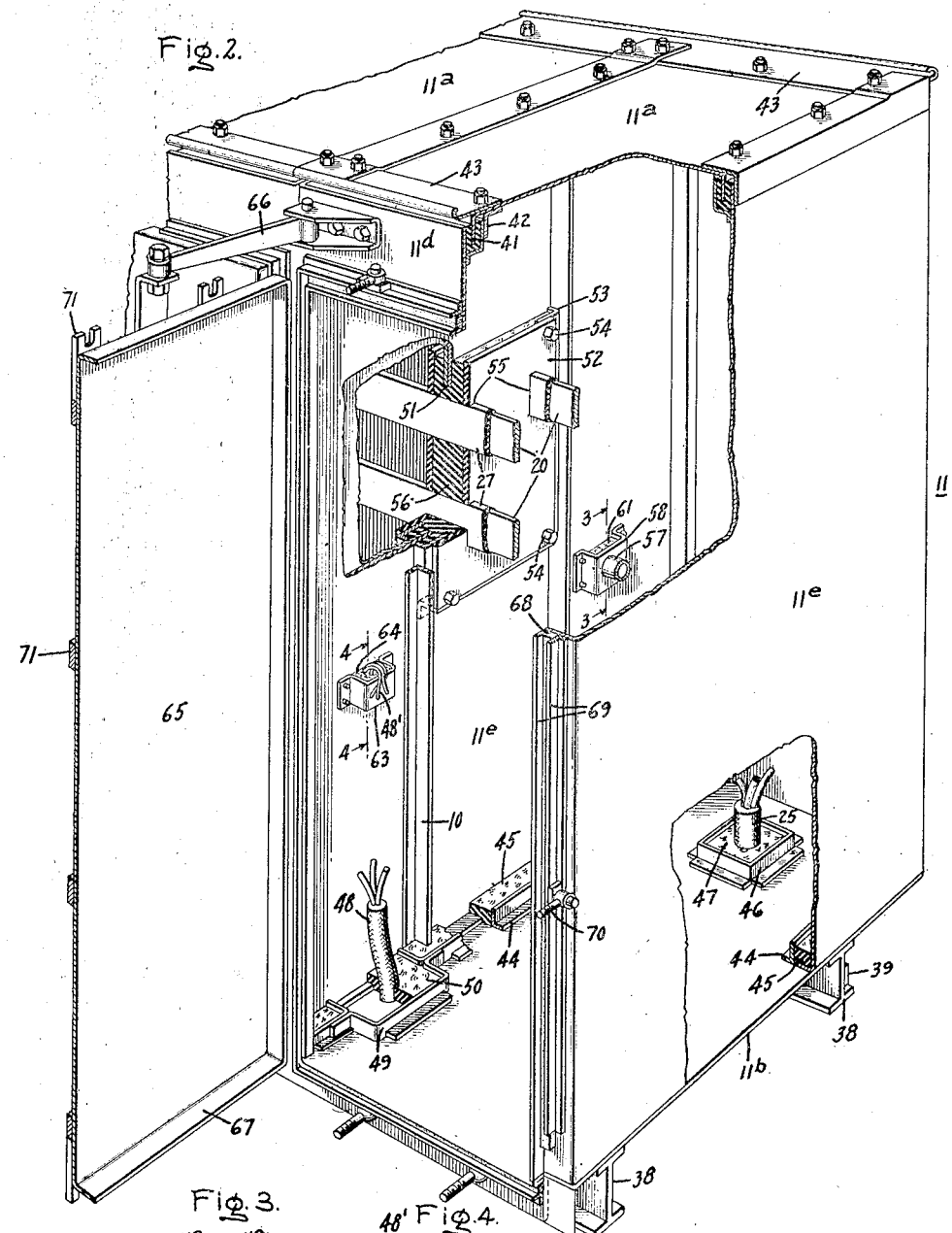
Figures 3, 4:
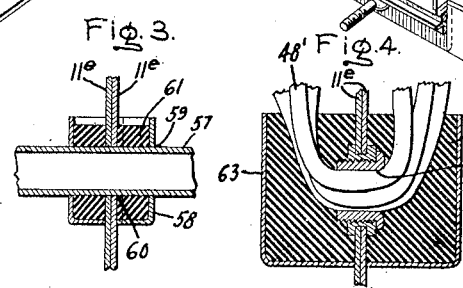

For a better understanding of our invention, reference may be had to the accompanying drawings in which Fig. 1 is an elevational side view partly in section of electrical switchgear of the metal-clad type embodying our invention, Fig. 2 is a perspective view partly in section showing the multiunit construction with the sealing means for preventing communiction of air or gases between the units or between any unit and the outside atmosphere, Fig. 3 is a sectional view taken on line 3—3 of Fig. 2, and Fig. 4 is a sectional view taken on line 4—4 of Fig. 2.

Referring now to the drawings, the electrical switchgear of the metal-clad type comprises a boxlike skeleton frame 10 which supports a sheet-metal wall structure 11, by which reference numeral the metal-clad unit is designated generally, forming an enclosure or cubiclelike structure housing the electrical apparatus of the unit. The top, bottom, back, front and side walls are specifically designated 11a, 11b, 11c, 11d and 11e, respectively. At the upper part of the structure, sheet-metal walls 12, 13, 14 and 15 form with the outside walls 11a and 11c a transformer compartment 16 for housing the usual current transformer 17 and the power transformer 18 from which control power for operating the circuit breaker to the closed position, for example, may be obtained. The sheet-metal walls 12, 13, 14 and 15 also cooperate to form a bus-bar compartment 19 within which are mounted the phase bus bars 20. The current transformers 17 are suitably insulated and mounted as at 21 with respect to the wall 12 and are provided with terminal connections 22 and 23 which are electrically connected, respectively, to the stationary portions of the primary disconnecting contacts not shown, disposed within insulating shells 24, and a feeder cable 25 (Fig. 2) through a pothead 26.

The phase bus bars 20 are suitably insulated as indicated at 27 and supported in spaced relationship with one another as indicated in the drawings. The bus bars 20 are provided with electrical connections 28 which terminate in the stationary portions of the primary disconnecting contacts, not shown, within insulating shells 29. The insulating shells 24 and 29 are open at their lower ends and are mounted on the wall 12 in alignment with apertures therein so as to receive the movable portions of the primary disconnecting contacts, not shown, which are carried by the circuit breaker generally indicated at 30.

The circuit breaker 30, which may be of any of the well-known types, is mounted in the lower part of the housing and, as illustrated, is adapted for vertical reciprocal movement between connected and disconnected positions with respect to the bus and feeder cable connections, although it should be understood by those skilled in the art that the structure might equally well be adapted so that the primary disconnecting contacts are made or broken by horizontal movement of the circuit breaker 30. As shown, the circuit breaker 30 is in the connected position with the stationary portions of the primary disconnecting contacts within shells 24 and 29 being in engagement with the coacting movable portions of these disconnecting contacts associated with the circuit breaker 30 so that the circuit between bus bars 20 and feeder cable 25, shown in Fig. 2, may be completed through the circuit breaker 30 as is well known in the art.

In the case of vertical lift switchgear, illustrated in the drawings, the elevating and lowering means for the circuit breaker 30 may comprise, as shown, a jackscrew arrangement including a main driving gear shaft 31 and jackscrews 32 which are connected to supporting members 33 of the circuit breaker 30. The driving gears 34 of the jackscrews 32 are disposed within channel-like members 35 which provide bearings for the shafts 31 and 32 and support the wall 12 of the bus bar and transformer compartments. It should be understood that the driving gear shaft may be manually or electrically operated.

The circuit breaker 30 is provided with a suitable operating mechanism 36 which is mounted thereon so that the switch unit comprising both the circuit breaker proper and its operating mechanism may be bodily lowered to the disconnected position and moved out of the front of the housing if desired. It will be understood by those skilled in the art that a suitable limit switch generally indicated at 37 and suitable interlocking means will also be provided.

Preferably, the metal-clad unit is mounted on a pair of supporting members 38, one of which also supports a ground bus 39.

In order that the metal-clad switchgear may be installed with greater safety in corrosive or hazardous atmospheres, such as in oil refineries or the like, the control relays, not shown, are mounted within an explosion-proof control box 40 mounted in the upper front part of the stationary housing. All of the relays which might have arcing contacts may be included in this unit except for limit switch 37 which is also preferably mounted in an explosion-proof casing or an oil vessel, thereby preventing arcing or the like from causing dangerous explosions due to the hazardous atmosphere. Any other devices which might have arcing contacts, such as undervoltage relays and auxiliary switches, may also be mounted in an oil vessel if not included in box 40.

As best shown in Fig. 2, a metal-clad switchgear installation will comprise a plurality of units mounted adjacent to one another with the bus bars 20 common to all the units. In order that such multiunit switchgear may be satisfactorily employed in a hazardous or corrosive atmosphere, we have provided sealing means for the individual units to prevent interchange of air or gases between units as well as between any unit and the surrounding atmosphere. In order to accomplish this sealing, two classifications of seals are employed, one, a permanent or fixed seal for sealing those parts which may be permanently sealed and, two, temporary seals for use at the doors of the metal-clad switchgear and internal compartments.

Considering first the permanent or fixed seals, it may be observed from Figs. 1 and 2 that the top walls 11a of the metal-clad units have the edges 41 thereof bent at right angles to the main body thereof to form a sort of pan. Also welded or bolted to the inner upper walls of the metal-clad unit is an angle-shaped member 42 which is so disposed as to provide a trough all around the upper part of the unit into which the edges 41 of the top wall 11a are adapted to extend when the top wall is in the assembled position as shown in Figs. 1 and 2. In order to seal completely the upper part of the unit, the trough formed by member 42 cooperating with the upper part of the housing of the metal-clad unit is filled with an insulating compound or plastic gasket material which is poured in a hot condition to seal this portion of the unit completely, thereby preventing interchange of gases either between units or between any unit and atmosphere. Preferably this compound remains in a semi-plastic condition even at normal temperatures. In order to protect the seal, suitable metal extensions, such as 43, may be provided at the upper part of the unit. It should be understood that these metal-clad units may be used either indoors or outdoors. In the event of outdoor installations, a slanting roof will preferably be provided in addition to the arrangements disclosed in Figs. 1 and 2.

As best shown in Fig. 2, the seal around the bottom of the unit is completed in much the same manner as the seal at the top thereof described in the preceding paragraph. A suitable angle-shaped member 44 is preferably welded to the bottom wall 11b of the unit parallel with the side walls 11e and spaced slightly therefrom to act as a cofferdam and provide a trough along the bottom of the side walls 11e. This trough is filled with an insulating compound 45 which is poured into the trough while hot and hardens to form a good seal along the bottom of the unit.

As was mentioned above, the primary cable or feeder cable 25 which is connected to the bus bars 20 through pothead 26 and circuit breaker 30 enters the bottom 11b of the metal-clad unit through a suitable opening therein. In order to seal this opening completely against the escape or entrance of air or gases, we provide a suitable cofferdam preferably constructed of an angle-shaped member which is suitably fastened to the floor or bottom wall 11b around the opening through which feeder cable or primary cable 25 enters the metal-clad unit. The space within the cofferdam 46 is filled with insulating compound 47 in the same manner as the seals around the bottom and top of the metal-clad unit described heretofore.

In order to provide remote control of the circuit breakers as well as to provide a secondary control power, we provide a secondary cable 48 which also enters through the bottom of the unit in the same manner as primary cable 25 and is provided with a similar secondary cable entrance seal including a cofferdam 49 welded to the bottom of the unit around the opening through which cable 48 enters and filled with a suitable sealing and insulating compound 50.

Referring to Fig. 2, it may be observed that the insulated buses 20 pass through relatively large openings 51 in the side walls 11e of adjacent metal-clad units which are arranged so that the openings 51 are in alignment. The buses are supported by means of pieces of solid insulation 52 which are bolted to angle members 53 as at 54 and the angle members 53 are welded or suitably fastened to the walls 11e so as to form a pocket or trough open at the top on either side of the aligned openings 51 between two adjacent units of metal-clad switchgear. The piece of solid insulation or insulating member 52 is provided with spaced openings 55 therein for the bus bars 20 and, in this manner the bus bars 20 are properly supported by the respective units. The plastic insulating compound 56 is then poured into the pocket or trough formed on either side of the common wall between adjacent units around the openings 51 therein completely to seal the point where the bus bars pass from one unit to the next.

It has been common practice heretofore, particularly when oil circuit breakers are used, to provide an exhaust pipe from the oil circuit breaker casing by which hot gases may escape therefrom. In metal-clad units of the type disclosed, it is necessary to provide a header through which all these hot gases from the different breakers in the respective units may escape without entering the sealed metal-clad units. Consequently, this header 57, passing from unit to unit and best shown in Fig. 3, must be provided with a suitable seal where it passes through the walls 11e of the unit. To this end, we provide a seal very similar to the seal around bus bars 20 which comprises fastening a pair of pocket-shaped members 58, having openings 59 therein for accommodating header 57, to the walls 11e adjacent the opening 60 therein through which header 57 passes. The space within the pockets 59 is then filled with a suitable insulating compound 61 in the same manner as the seal around the bus bars 20.

A similar seal must be provided for the secondary or control power which passes through the walls 11e between adjacent units. This seal is best shown in Fig. 4 where control cable 48' passes through an opening 62 in the walls 11e. A pair of pockets 63 are fastened to the walls 11e on either side of the opening 62 in the same manner as the pockets 58 associated with the header or exhaust-pipe seal and these pockets are filled with an insulating compound 64 in the same manner as was described heretofore in connection with the header or exhaust pipe seal.

Considering now the temporary seals, the front wall 11b of each metal-clad unit is preferably provided with a door 65 of sheet metal suitably hinged as at 66. Door 65 is preferably constructed with a depending flange 67 all around the edge thereof. A suitable gasket 68, preferably comprising a material composed of felt covered with polymerized chloroprene, completely surrounds the door opening and the front wall 11d of the metal-clad unit, this gasket material being held between an angle member frame 69. When the door is closed and the unit sealed, the depending flanges 67 thereof are pressed into engagement with the gasket material by means of suitable eyebolts 70 provided around the door frame which engage cooperating extensions 71 provided on door 65. Preferably, wing nuts, not shown, are provided to compress the gasket material and thereby provide an effective temporary seal around door 65.

The back wall 11c of the metal-clad unit preferably comprises a removable plate to enable workmen to get at the apparatus included within the metal-clad unit and, consequently, it must also be provided with a temporary seal. Accordingly, we have shown a gasket 72 (Fig. 1) substantially identical with the gasket 68 which is pressed into sealing engagement with the depending flanges 73 of back wall or removable plate 11c by suitable means, not shown.

In order to prevent an interchange of gases between any metal-clad unit and atmosphere through the opening 74 therein (see Fig. 1) through which the crank for operating the shaft 31 of the elevating mechanism may be inserted, we provide a suitable cover 75 which is threadedly mounted on a tubular extension 76 surrounding the opening 74. It should be understood that if electrical means are provided to operate shaft 31, such means may be controlled externally of the sealed unit so that the circuit breaker may be lowered to isolate the circuit without disturbing any of the seals of the unit.

It will be observed that with the sealing arrangement described above for electrical switchgear of the multi-unit type having common members, such as bus bars, control wiring, and exhaust piping, no interchange of air or gases between units or between any unit and the outside atmosphere can occur and, consequently, such metal-clad switchgear is satisfactory for use in installations where it may be subject to corrosive and hazardous atmospheres.

While we have shown and described our invention in connection with certain specific embodiments, it should be understood that our invention is not limited to the specific details of construction and arrangement thereof herein illustrated and that changes and modifications may occur to one skilled in the art without departing from the spirit and scope of our invention as set forth in the appended claim.

What we claim as new and desire to secure by Letters Patent of the United States is:

Electrical switchgear of multiunit construction comprising a plurality of unitary cells mounted adjacent one to another to form a continuous structure, a bus bar common to all of said unitary cells and contained within said cells, and means for effectively preventing the communication of air or gases between said cells at the point where said bus bar passes from one cell to the other comprising a trough-shaped member arranged on either side of said point to form a pocket and an insulating compound filling said pocket on both sides of the point where said bus bar passes from one cell to another to provide an effective seal.

GEORGE M. REED.
BERTRAM W. MAHONEY.